United States Patent
Weinländer et al.

(10) Patent No.: US 7,818,669 B2
(45) Date of Patent: Oct. 19, 2010

(54) SCROLLING FACILITY WITH FIXING MECHANISM

(75) Inventors: Markus Weinländer, Happurg (DE); Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 1246 days.

(21) Appl. No.: 11/170,663

(22) Filed: Jun. 29, 2005

(65) Prior Publication Data
US 2006/0005145 A1 Jan. 5, 2006

(30) Foreign Application Priority Data
Jun. 30, 2004 (EP) .................... 04015411

(51) Int. Cl.
G06F 17/00 (2006.01)
G06F 3/048 (2006.01)
(52) U.S. Cl. .................. 715/273; 715/973; 715/784
(58) Field of Classification Search ............... 715/273, 715/973, 784
See application file for complete search history.

(56) References Cited

U.S. PATENT DOCUMENTS

| | | | |
|---|---|---|---|
| 6,195,094 B1 * | 2/2001 | Celebiler | 715/764 |
| 6,912,694 B1 * | 6/2005 | Harrison et al. | 715/784 |
| 7,703,043 B2 * | 4/2010 | Utsuki et al. | 715/830 |
| 2004/0100501 A1 * | 5/2004 | Dornback | 345/769 |
| 2004/0103369 A1 | 5/2004 | Robertson et al. | |
| 2004/0250220 A1 * | 12/2004 | Kalenius | 715/864 |
| 2005/0132303 A1 * | 6/2005 | Grotjohn | 715/853 |
| 2005/0205720 A1 * | 9/2005 | Peltz et al. | 246/187 A |
| 2005/0226504 A1 * | 10/2005 | Kondo et al. | 382/173 |

OTHER PUBLICATIONS

Reference U—Screen Shot of MS Outlook. Copyrigth 2003.*
Blattner et al. "Special Edition Using Microsoft Office Excel 2003". Copyright Date: Sep. 11, 2003.*
Microsoft Corporation, "Visualisierung der mit dem ScrollBar verbunden ToolTip Funktion in Word2002", Jan. 1, 2003, pp. 1-4, XP002315610.

* cited by examiner

Primary Examiner—Laurie Ries
Assistant Examiner—Soumya Dasgupta

(57) ABSTRACT

The invention relates to a scrolling facility for moving information (I) shown in a display area (3), with recognition means for identifying higher-ranking elements (1) from the displayed information (T) and fixing means for fixing the position (Fix) of at least one higher-ranking element within the display area, with the fixing means being embodied such that the at least one higher-ranking element remains fixed while at least one of the subordinate elements (2) assigned to the higher ranking element (1) is visible in the display area (3).

19 Claims, 3 Drawing Sheets

SCROLLING FACILITY WITH FIXING MECHANISM

CROSS REFERENCE TO RELATED APPLICATIONS

This application claims priority to the European application No. 04015411.4, filed Jun. 30, 2004 and which is incorporated by reference herein in its entirety.

FIELD OF INVENTION

The invention relates to a scrolling facility for moving information shown in a display area. The invention further relates to a corresponding scrolling method.

SUMMARY OF THE INVENTION

Frequently a greater volume of data must be presented on a screen than is able to displayed with sensible legibility. Therefore only a section of the volume of data is displayed. A user can move the visible section by means of a scrollbar.

Scrollbars are a well-known and easy-to-use tool for the user. They are therefore employed in practically all applications. Scrollbars do however have the disadvantage that information which is of importance for understanding a specific displayed area moves off the visible section of the display under some circumstances during scrolling. A user of a corresponding application can thus under some circumstances easily lose their overview of how certain information is assigned to higher-ranking elements or levels. This disadvantage occurs especially with Web-oriented views and with what are known as tree controls.

With Web-oriented views for example tables or lists can be used somewhere within a Web site. If a user now uses the scrollbar to move the visible section of a Web site with such tables of lists, the result is that the corresponding table header is the first to disappear from the visible section. The individual table fields below the header can no longer be assigned their appropriate meaning because of the lack of a suitable label. This is especially a disadvantage with complex tables as used to set parameters for technical systems.

The same effect occurs with so-called tree controls, with which a multiplicity of elements can be shown in their hierarchical context. If the visible section is scrolled by the user here, although the individual elements are still visible, the top-level node of the tree is not. This can above all be inconvenient when the upper-level nodes contribute to the understanding of the tree. For example it may be of importance whether corresponding elements are stored in the "made and tested" folder or in the "scrap" folder.

The underlying object of the invention is thus to specify a scrolling device and a scrolling method in which the higher-ranking information elements remain visible for a user.

The object is achieved by a scrolling facility for moving information shown in a display area with means of detection for identifying higher-ranking elements on the information shown and fixing means for fixing the position of at least one higher-ranking element within the display area, where the fixing means are embodied such that the at least one higher-ranking element remains fixed while at least one subordinate element assigned to the higher-ranking element is visible in the display area.

Furthermore the object is achieved by a scrolling method for moving information shown in a display area, in which higher-ranking elements are identified from the displayed information and the position of at least one higher-ranking element is fixed within the display area, with the at least one higher-ranking element remaining fixed while at least one subordinate element assigned to the higher-ranking element is visible in the display area.

The invention is based on the recognition that when the information displayed in a window is moved, that is during the process known as scrolling, there is also higher-ranking information which is of importance to the user for the understanding of subordinate information which sooner or later must move out of the visible area. Typical examples of such information might be table headers or folders higher up in the hierarchical structure of a tree control. The moment that the scrollbar moves the higher-ranking information content out of the display area the user loses an overview of the context of the information displayed in the window.

This is a particular disadvantage if complex situations are shown in large tables for example. Especially when Web views are used in which normal text elements and tables can alternate, it is of advantage for table headers to be recognized as such and not to be scrolled out of the display area while further information or table contents assigned to them are shown in the visible area of the display.

It is just as advantageous in the field of large text documents, for example Word documents or files in other word processing systems, in which for different hierarchically-structured headers, text elements appear in longer paragraphs for example. If a user scrolls through the Word document titles can remain here at the edge of the display field and the corresponding text belonging to the title can be scrolled through as usual. This means that the user of the word processing system always has an overview of the chapter or the title to which the part of the text being moved by the scrollbar through the visible window belongs.

Advantageously within the framework of the inventive system the higher-ranking elements, that is for example table headers, higher-ranking folders in a tree control or titles of a text document can be assigned identities on the basis of which they can be identified by the system or by detection means of the scrolling facility as higher-ranking elements. If this type of higher-ranking element moves during a scrolling procedure over the visible area or over the display, it is detected as such and retained by the fixing means after passing through the display in a position so that it is possible for the user of the system even on continuation of the scrolling process to continue to see the corresponding higher-ranking information.

A further advantageous embodiment the invention is characterized by the fact that at least one higher-ranking element is fixed after passing through the display area. This is especially of advantage since for example a table header in this case moves into the visible display area from below when a scrolling process is executed and after it has passed through the corresponding display area completely is fixed at the upper end of the display area in its position before it leaves the visible display area. In this way a whole series of associated subordinate elements can be seen in the display area. The display area can thus not fill with associated information before the subordinate elements below the fixed header or the higher-ranking element leave the screen at the edge of the screen.

A further advantageous embodiment of the invention is characterized in that, with a horizontal movement of the information, the position of the at least one higher-ranking element is fixed at a vertical edge of the display area or that with a vertical movement of the information the position of the at least one higher-ranking element is fixed at a horizontal edge of the display area.

This advantageous embodiment of the invention makes it possible to use both vertical Scrollbars to move information vertically as well as horizontal Scrollbars, for example at the lower edge of a corresponding display window, for horizontal scrolling of information. This means that with the aid of the inventive system volumes of data for which there is no clear overview which extend both in height and in width over the displayable area can be used so that higher-ranking information is fixed at the corresponding edge of the display window. Both horizontal and also vertical scrolling is supported in this way.

A further advantageous embodiment of the invention is characterized in that the detection means for identifying a hierarchy of the higher-ranking elements is provided and that the fixing means for fixing the position of higher-ranking elements is provided depending on the hierarchy level. This makes it possible to assign different identifiers to different hierarchy levels or different structures of information and, depending on these different identifiers, to have the position of the information fixed at the edge of the screen after scrolling through the display area. A simultaneous fixing of a number of hierarchy levels or an exclusive fixing of the position of individual hierarchy levels is made possible by this advantageous embodiment of the invention.

A further advantageous embodiment of the invention is characterized in that selection means for selection by a user of the scrolling facility of the hierarchy levels of the higher-ranking elements to be fixed by the fixing means are provided. This enables the user, within the framework of the application, for example using a pull-down menu or by using what are known as radio buttons or boxes to be checked, to select one or more higher-ranking hierarchy levels which on scrolling through the corresponding document are to be fixed in their position at the edge of the display area. This makes it possible for the user to make any selection of the information elements to be fixed. For example when scrolling through an extensive Word document only the heading belonging directly to the text area might be relevant, while all higher-ranking headings do not offer the user any additional information content. On the other hand it may be highly important for individual text elements to be assigned to a hierarchy level located further up in the hierarchy of the titles so that the user is given the corresponding overview of a higher-value more general structure of the text.

A further advantageous embodiment of the invention is characterized in that the higher-ranking elements are embodied as tables, header lines and/or document titles and/or a tree control. Within the framework of the inventive system this provides the opportunity of displaying different forms of documents with the aid of a corresponding scrolling facility.

The invention is described and explained in more detail below on the basis of the exemplary embodiments shown in the Figures.

DETAILED DESCRIPTION OF THE INVENTION

Figure 1:
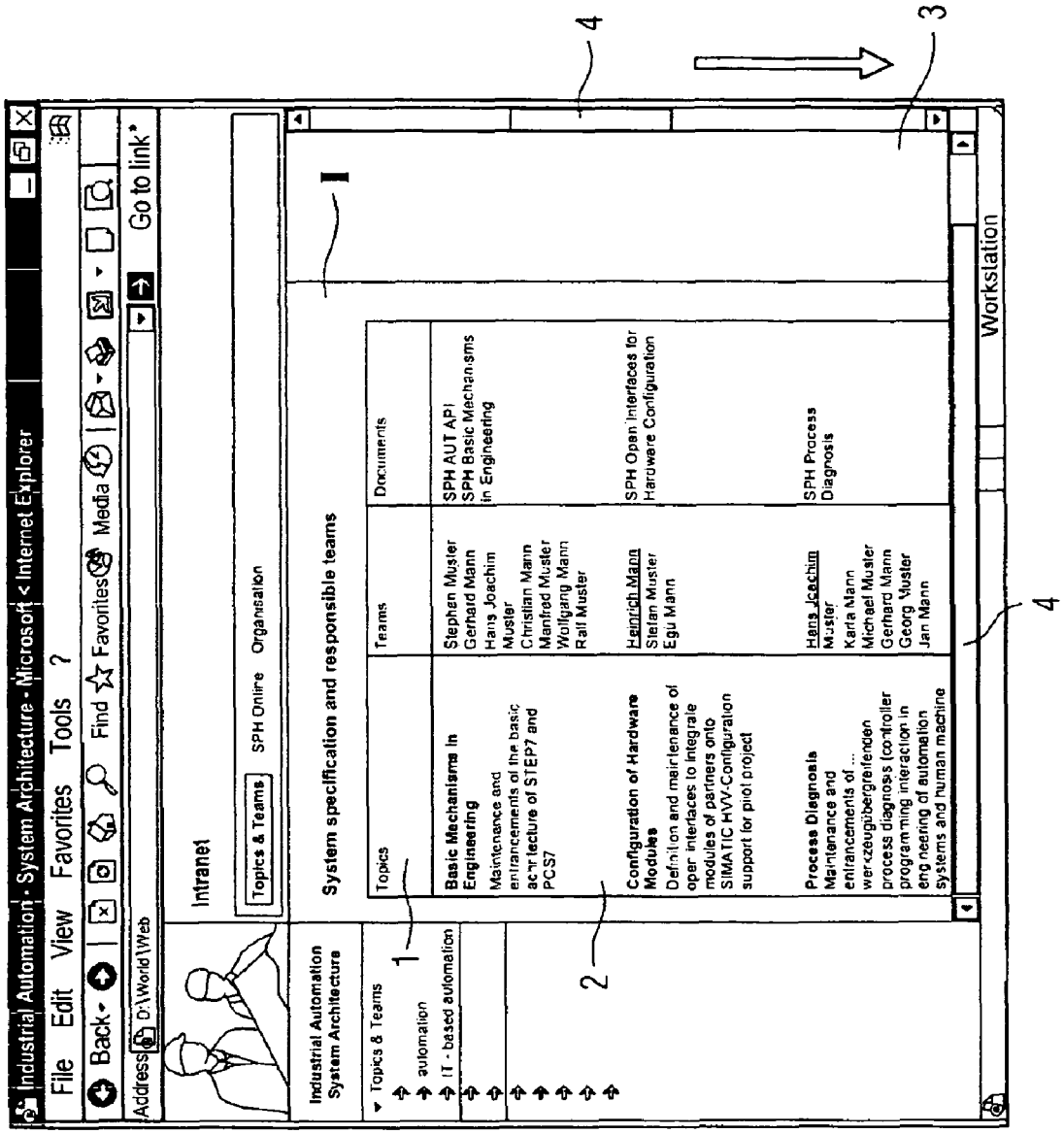
FIG. 1 shows a typical version of the inventive system with the table.
Figure 2:
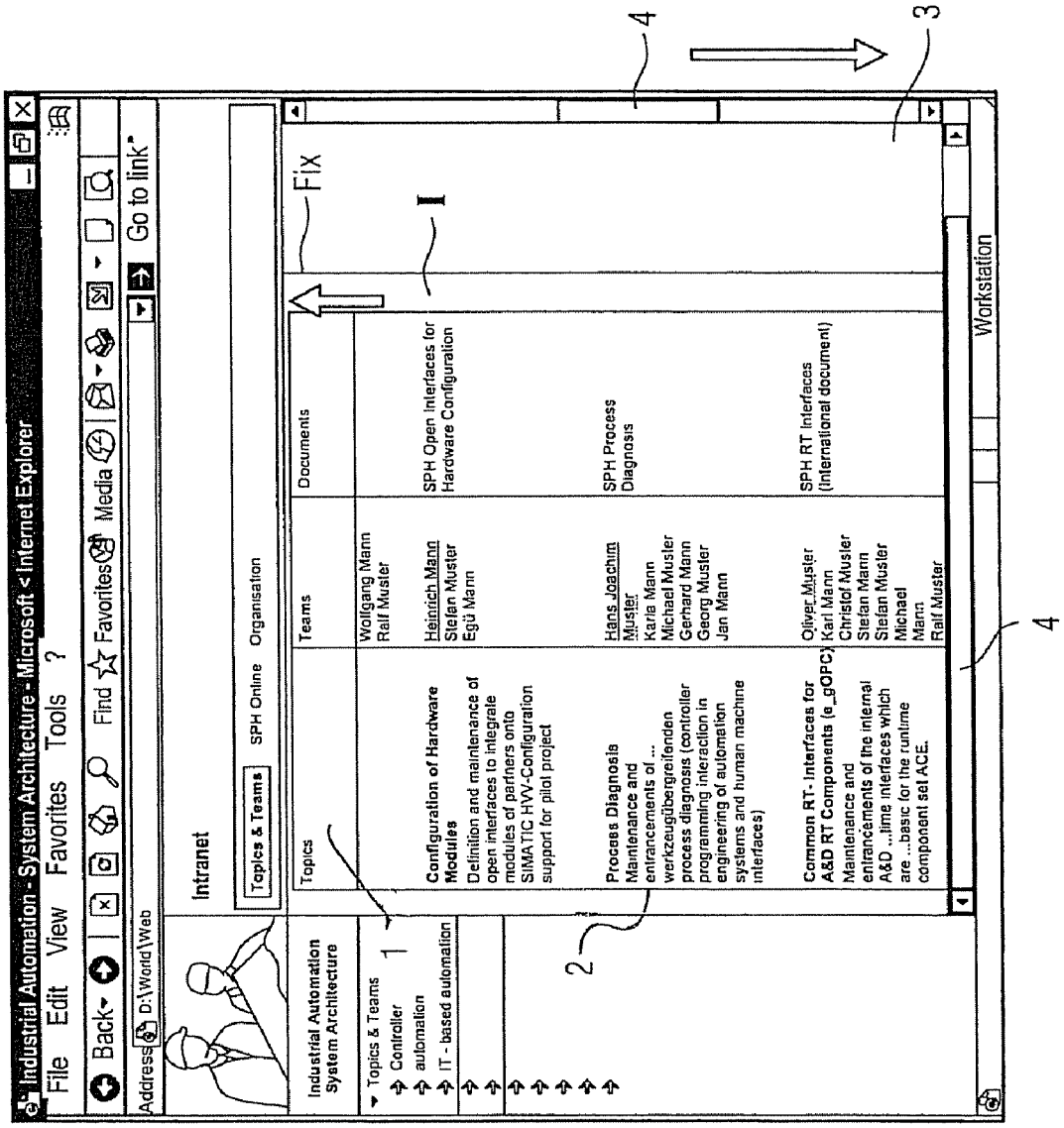
FIG. 2 shows an version according to FIG. 1 with fixed higher-ranking elements.

FIG. 1 and FIG. 2 show a surface, for example of a monitor, with a display area 3, in which information I is displayed. With the aid of the scrollbar 4 the information I in the display area 3 can be moved in such a way that only a part of the information I is ever visible. For large documents the user can thus have different parts displayed in the display area 3 by using the scrollbar 4. A scrollbar 4 can be used to move the information both vertically and also horizontally. This means that in both a vertical and horizontal direction more information can be displayed than can be seen in the actual display area. With the aid of the inventive scrolling facility or the method table header lines are for example identified as higher-ranking elements 1 and can then be identified as such with the aid of detection means when the user scrolls through the information. These higher-ranking elements 1 are assigned subordinate elements 2. The higher-ranking elements 1 are then fixed with the aid of fixing means on scrolling through the corresponding page in a visible position in the display area 3 assigned subordinate elements 2, for example a table content is visible in the display area 3.

On scrolling through a Web site as is shown in FIG. 1, an upwards movement, for example as is shown by the direction of the arrow, moves the corresponding page upwards out of the display area 3. Above the table or above the header line of the table which corresponds to a higher-ranking element 1, normal text can still be seen at the start of the movement. Now, as soon as no further elements are displayed above the table header, that is the higher-ranking element 1—i.e. as soon as the table header line has reached the upper edge of the display area 3, this upper edge defines a "stop" for the table header line. This is identified in FIG. 2 with the reference symbol Fix. Further movement of the scrollbar 4 by the user only moves the table content, i.e. the subordinate elements 2 assigned to the higher-ranking element 1. Only once the complete table contents, i.e. all subordinate elements 2 are moved out of the visible section or out of the display area 3, does the higher-ranking element 1, in this case the table header line, disappear.

Figure 4:
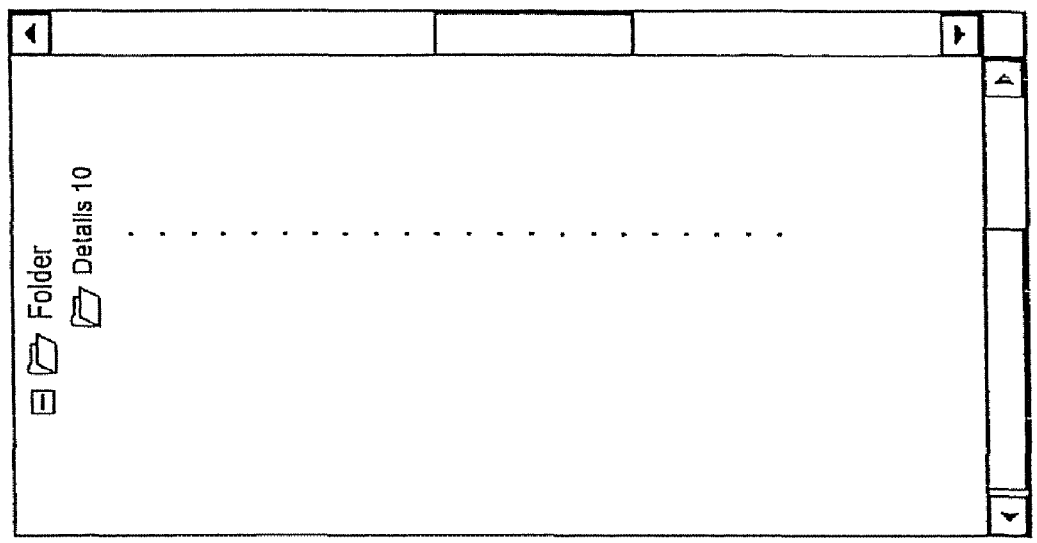
FIG. 4 shows a version in accordance with FIG. 3 with fixed higher-ranking elements.
Figure 3:
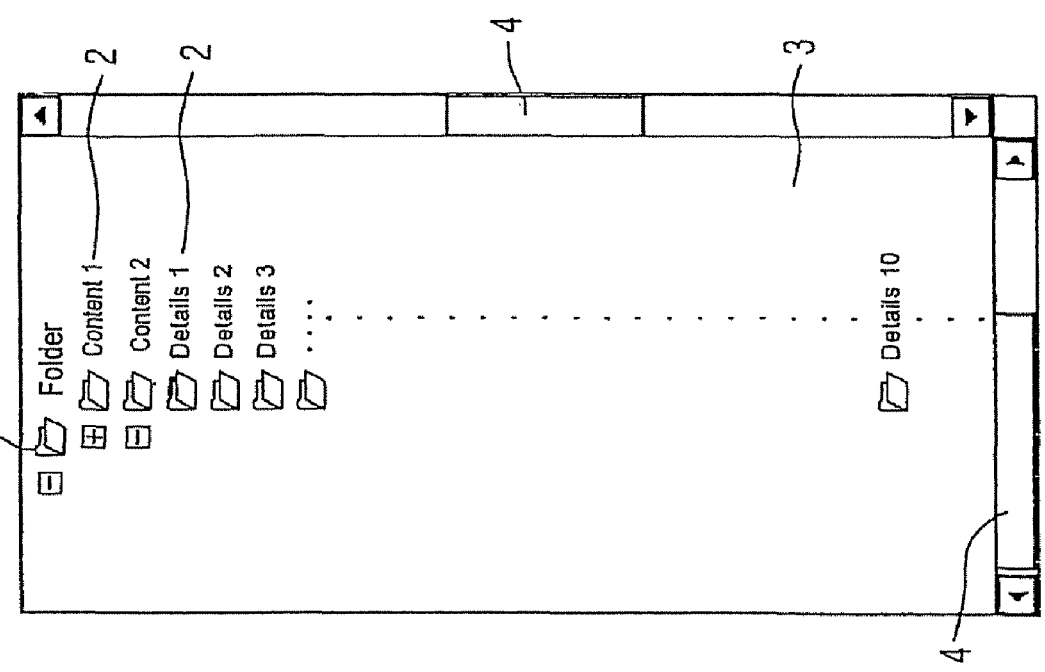
FIG. 3 shows a typical illustration of the scrolling facility with a tree control.

FIG. 3 and FIG. 4 show a further embodiment of the invention in which the scrolling facility is used for navigation within a tree control. In this embodiment folders are structured in different hierarchy levels within the tree control. When the corresponding scrollbar is moved, folders which are located further up in the hierarchy are identified as so-called higher-ranking elements 1, and remain positioned corresponding at the top edge of the window, while the subordinate elements 2 assigned to them move out of the display area 3. In this case too the higher-ranking folders remain fixed while subordinate elements assigned to them are visible in the display-area 3, as shown in FIG. 4. Depending on the choice made by the user, a number of higher-ranking elements can remain fixed a the stop. The user can also select which hierarchy level is to remain fixed at the upper stop.

Likewise a sideways or horizontal scrolling is possible and in this case the user can also have elements arranged in different hierarchies fixed by means of identifiers. For example with a tree control higher-ranking folders of an upper hierarchy can remain stationary while the horizontal scrollbar is used to move in the direction of the level of the leaves. If all hierarchy levels no longer fit between a higher-ranking hierarchy and the leaves of the tree control in the screen area, intermediate hierarchy levels can be scrolled away sideways, so that only a higher ranking level of folders provided for fixing is left.

A corresponding scrolling facility can also be used for fixing of titles in word processing documents.

The invention claimed is:

1. A scrolling facility for moving information displayed in a display area of a monitor, the facility comprising:
   a processor;
   a recognition means that executes on the processor to identify a higher-ranking element in the displayed information;
   an assigning means that executes on the processor to assign subordinate elements to the higher-ranking element;
   a scrolling means that executes on the processor to scroll the higher-ranking element and the subordinate elements;
   a fixing means that executes on the processor to fix the position of the scrolled higher-ranking element within the display area, wherein the scrolled higher-ranking element remains fixed while at least one of the subordinate elements assigned to the scrolled higher-ranking element is visible in the display area, such that the scrolled higher-ranking element is fixed and visible within the display area while the at least one subordinate element moves in and out of the visible area during scrolling,
   wherein, once all of the subordinate elements are moved out of the visible area during scrolling, the scrolled higher-ranking element disappears.

2. The scrolling facility in accordance with claim 1, wherein the at least one higher-ranking element is fixed after passing through the display area.

3. The scrolling facility in accordance with claim 1, wherein by a horizontal movement of the information, the position of the at least one higher-ranking element is fixed at a vertical edge of the display area.

4. The scrolling facility in accordance with claim 1, wherein by a vertical movement of the information, the position of the at least one higher-ranking element is fixed at a horizontal edge of the display area.

5. The scrolling facility in accordance with claim 1, wherein the recognition means is provided for identifying a hierarchy of the higher-ranking elements.

6. The scrolling facility in accordance with claim 5, wherein the fixing means is provided for fixing the position of higher-ranking elements depending on their hierarchy level.

7. The scrolling facility in accordance with claim 6, further comprising:
   a selection means that executes on the processor to select the hierarchy levels of the higher-ranking elements to be fixed by the fixing means.

8. The scrolling facility in accordance with claim 7, wherein the selection means is operated by a user.

9. The scrolling facility in accordance with claim 1, wherein the higher-ranking elements are embodied as table header lines, and/or document titles, and/or folders of a tree control.

10. The scrolling facility in accordance with claim 1, wherein the fixing of the position of the higher-ranking elements can be suspended when the assigned subordinate elements are moved out of the display area.

11. A scrolling method for moving information shown in a display area of a monitor, the method comprising:
    identifying a higher-ranking element in the shown information;
    assigning subordinate elements to the higher-ranking element;
    scrolling the higher-ranking element and the subordinate elements;
    fixing a position of the scrolled higher-ranking element within the display area, wherein the scrolled higher-ranking element remains fixed while at least one of the subordinate elements assigned to the scrolled higher-ranking element is visible in the display area, such that the scrolled higher-ranking element is fixed and visible within the display area while the at least one subordinate element moves in and out of the visible area during scrolling,
    wherein, once all of the subordinate elements are moved out of the visible area during scrolling, the scrolled higher-ranking element disappears.

12. The scrolling method in accordance with claim 11, wherein the at least one higher-ranking element is fixed after passing through the display area.

13. The scrolling method in accordance with claim 11, wherein during a horizontal movement of the information, the position of the at least one higher-ranking element is fixed at a vertical edge of the display area.

14. The scrolling method in accordance with claim 11, wherein during a vertical movement of the information, the position of the at least one higher-ranking element is fixed at a horizontal edge of the display area.

15. The scrolling method in accordance with claim 11, further comprising:
    identifying a hierarchy level for each higher-ranking element.

16. The scrolling method in accordance with claim 15, further comprising:
    fixing the position of a higher-ranking element depending on its identified hierarchy level.

17. The scrolling method in accordance with claim 16, wherein the hierarchy level of a higher-ranking element to be fixed is selected by a user.

18. The scrolling method in accordance with claim 11, wherein the table header lines, and/or document titles, and/or folders of a tree control are higher-ranking elements.

19. The scrolling method in accordance with claim 11, wherein the fixing of the position of a higher-ranking element is canceled if the assigned subordinate elements are moved out of the display area.

* * * * *